F. CHILLINGWORTH,
Assignor to A. M. LESLIE.
CARTRIDGE BOX.
No. 10,120. Reissued May 23, 1882.
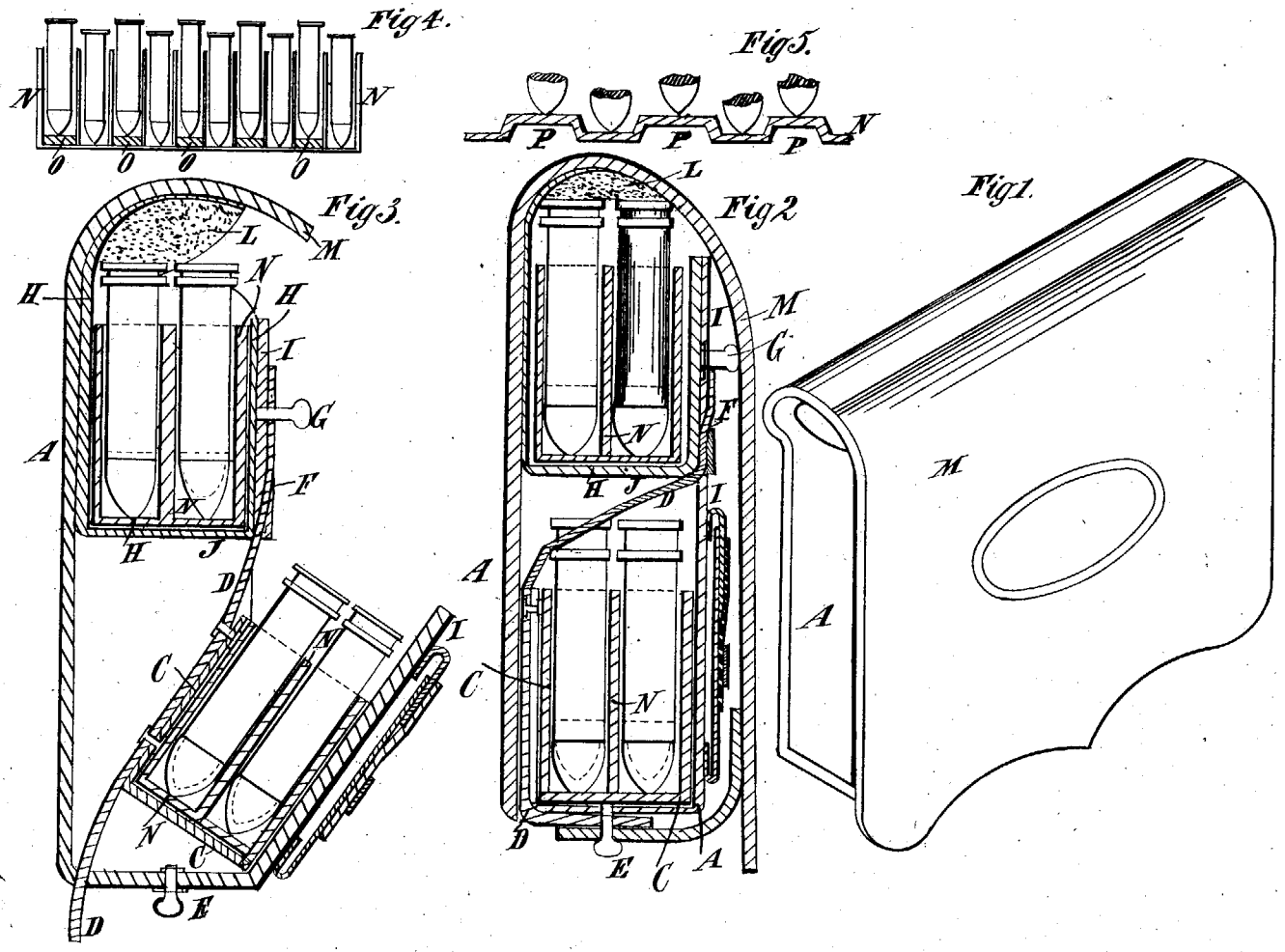
Witnesses:
Chandler Hall
T. J. Keane
Inventor:
Felix Chillingworth
By his atty.
Edwin H. Brown
N. PETERS, Photo-Lithographer, Washington, D. C.

UNITED STATES PATENT OFFICE.

FELIX CHILLINGWORTH, OF NEW HAVEN, CONNECTICUT, ASSIGNOR TO ANDREW M. LESLIE, OF CHICAGO, ILLINOIS.

CARTRIDGE-BOX.

SPECIFICATION forming part of Reissued Letters Patent No. 10,120, dated May 23, 1882.

Original No. 91,419, dated June 15, 1869; antedated June 7, 1869. Application for reissue filed September 28, 1881.

*To all whom it may concern:*

Be it known that I, FELIX CHILLINGWORTH, formerly of the city of Springfield, in the county of Hampden and State of Massachusetts, but now of New Haven, in the county of New Haven and State of Connecticut, have invented a new and Improved Cartridge-Box; and I do hereby declare that the following is a full and exact description thereof.

The invention consists in a portable cartridge-box comprising the combination of a box or case which may be opened at the front, an upper compartment, and a lower compartment adapted to be tilted forward just beyond the upper compartment to facilitate the extraction of cartridges therefrom without endangering their falling out and while the compartments are in said box or case.

The invention also consists in a cartridge-box comprising the combination of an upper compartment, a lower compartment adapted to be tilted forward just beyond the upper compartment to facilitate the extraction of cartridges therefrom without endangering their falling out, and means for limiting the forward-tilting movement of said lower compartment and supporting it in its tilting position.

The invention also consists in details of construction hereinafter explained.

In the accompanying drawings, Figure 1 is a perspective view of a cartridge-box embodying my improvements. Fig. 2 is a central vertical section, on a larger scale, of the said box. Fig. 3 is a similar section thereof, showing a swinging compartment swung forward. Fig. 4 is a longitudinal section of one of the compartments of said box; and Fig. 5 is a detail view, illustrative of the bottom of a compartment of said box.

Similar letters of reference designate corresponding parts in all the figures.

To enable others skilled in the art to make and use my invention, I will proceed to describe its construction and operation.

A is the box or case proper, and M a flap forming the front thereof and adapted to be turned up to expose or open the front. To this box or case is attached a compartment, C, fastened so that it may be swung forward, so that its top will easily be accessible.

D is a strap, which in this example of my invention serves as the stop for precluding the compartment from tilting or swinging too far forward, and for holding and supporting said compartment when tilted or swung forward. It may be buttoned or slipped over a knob, E, drawn up at the opening F, and buttoned to the knob G, to open it. It is operated in reverse order to close and fasten it in place.

H is another compartment, arranged above the former, and formed in the present instance by lining the top part of front I, crossing at J, to the back of box A, where it is stitched or riveted. A pad, L, of soft material—such as wool—is secured to that part of the flap M which comes in contact with the contents of the compartment H, and is placed there to prevent them falling out when the flap is unfastened, or from being exploded by any sudden concussion on the top of the box.

N N are cases, which may be of paper, and are made with raised bottoms O, so as to elevate the contents of adjacent cells alternately one above another by means of pieces O O put in the case, or by bending up the bottom P to produce the same effect, as shown in Fig. 5.

I am aware that the cells, pockets, or bodies of boxes have been lined with sheep-skin, but not that the cover has been provided with a pad, as I provide it. I am also aware that the cells have been so arranged that the contents of those composing one row or series are elevated above those in another row or series; but as these features form no part of my invention I do not claim them.

What I claim as my invention, and desire to secure by Letters Patent, is—

1. A cartridge-box comprising the combination of a box or case which may be opened at the front, an upper compartment, and a lower compartment adapted to be tilted forward just beyond the upper compartment to facilitate the extraction of cartridges therefrom without endangering their falling out and while both compartments are in said box or case, substantially as specified.

2. A cartridge-box comprising the combination of an upper compartment, a lower compartment adapted to be tilted forward just beyond the upper compartment to facilitate the extraction of cartridges therefrom without endangering their falling out, and means for limiting the forward-tilting movement of said lower compartment and supporting it in its tilted position, substantially as specified.

3. A cartridge-box having two compartments, C and H, one above the other, the lower one of which is hinged at A and operated by means of the strap D, all constructed and operating substantially as herein described and set forth.

4. A cartridge-box containing the compartments C and H, the lower being hinged at A, the strap D, buttons E G, flap-lining L, and openings for said strap D.

FELIX CHILLINGWORTH.

Witnesses:
THOS. G. SLOAN,
CHAS. S. HAMILTON.